United States Patent
Nanda et al.

(10) Patent No.: US 8,630,590 B2
(45) Date of Patent: Jan. 14, 2014

(54) APPARATUS AND METHOD FOR WIRELESS COMMUNICATION VIA AT LEAST ONE OF DIRECTIONAL AND OMNI-DIRECTION ANTENNAS

(71) Applicant: QUALCOMM Incorporated, San Diego, CA (US)

(72) Inventors: Sanjiv Nanda, Ramona, CA (US); Saishankar Nandagopalan, San Diego, CA (US); Santosh Abraham, San Diego, CA (US); Jay Rodney Walton, Carlisle, MA (US); Ernest T Ozaki, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/768,117

(22) Filed: Feb. 15, 2013

(65) Prior Publication Data

US 2013/0157578 A1 Jun. 20, 2013

Related U.S. Application Data

(62) Division of application No. 12/712,715, filed on Feb. 25, 2010, now Pat. No. 8,401,483, which is a division of application No. 11/758,578, filed on Jun. 5, 2007, now Pat. No. 8,175,532.

(60) Provisional application No. 60/811,578, filed on Jun. 6, 2006.

(51) Int. Cl.
*H04B 1/00* (2006.01)

(52) U.S. Cl.
USPC .............................. 455/63.4; 455/25; 343/757

(58) Field of Classification Search
USPC ................. 455/19, 25, 63.4, 279.1, 506, 500; 342/403, 405, 423, 432, 437, 445; 370/334; 375/345–349, 267, 316, 375/147–150, 260, 285, 340; 343/754, 853, 343/757

See application file for complete search history.

(56) References Cited

U.S. PATENT DOCUMENTS

| 4,369,520 | A | 1/1983 | Cerny, Jr. et al. |
| 7,047,046 | B2 | 5/2006 | Hoffmann et al. |

(Continued)

FOREIGN PATENT DOCUMENTS

| CN | 1574698 A | 2/2005 |
| CN | 1599138 A | 3/2005 |

(Continued)

OTHER PUBLICATIONS

Choudhury, R., et al., "Using Directional Antennas for Medium Access Control in Ad Hoc Networks," Proceedings of ACM MOBICOM '02, Atlanta, Georgia, USA, Sep. 23-28, 2002, pp. 1-12.

(Continued)

*Primary Examiner* — Dominic E Rego
(74) *Attorney, Agent, or Firm* — Sam Talpalatsky; Nicholas J. Pauley; Joseph Agusta

(57) ABSTRACT

Techniques for using at least one of omni-directional and directional antennas for communication are described. A station may be equipped antenna elements selectable for use as an omni-directional antenna or one or more directional antennas. The station may select the omni-directional antenna or a directional antenna for use for communication based on various factors such as, e.g., whether the location or direction of a target station for communication is known, whether control frames or data frames are being exchanged, etc.

22 Claims, 11 Drawing Sheets

(56) References Cited

U.S. PATENT DOCUMENTS

| | | |
|---|---|---|
| 7,075,902 B2 * | 7/2006 | El Batt .................... 370/310 |
| 7,224,685 B2 | 5/2007 | Proctor, Jr. |
| 7,286,844 B1 * | 10/2007 | Redi et al. ................ 455/522 |
| 7,366,464 B2 | 4/2008 | Iacono et al. |
| 7,379,741 B2 | 5/2008 | Ahn et al. |
| 7,403,171 B2 | 7/2008 | Zimmerman et al. |
| 7,453,832 B2 | 11/2008 | Steer et al. |
| 7,463,200 B2 | 12/2008 | Gainey et al. |
| 7,545,782 B2 | 6/2009 | Rayment et al. |
| 7,664,054 B2 * | 2/2010 | Adya et al. ............... 370/255 |
| 7,760,697 B1 | 7/2010 | Giallorenzi et al. |
| 8,175,532 B2 | 5/2012 | Nanda et al. |
| 8,199,723 B2 * | 6/2012 | Li et al. .................... 370/334 |
| 8,335,475 B2 | 12/2012 | Nanda et al. |
| 2003/0048770 A1 | 3/2003 | Proctor, Jr. |
| 2004/0152420 A1 | 8/2004 | Redi et al. |
| 2004/0157613 A1 | 8/2004 | Steer et al. |
| 2004/0157637 A1 | 8/2004 | Steer et al. |
| 2004/0242273 A1 | 12/2004 | Corbett et al. |
| 2004/0242275 A1 | 12/2004 | Corbett et al. |
| 2005/0037822 A1 | 2/2005 | Regnier et al. |
| 2005/0063340 A1 | 3/2005 | Hoffmann et al. |
| 2005/0075141 A1 | 4/2005 | Hoffmann et al. |
| 2005/0134518 A1 | 6/2005 | Zimmerman et al. |
| 2005/0152473 A1 * | 7/2005 | Maltsev et al. ........... 375/299 |
| 2005/0185606 A1 | 8/2005 | Rayment et al. |
| 2005/0227658 A1 | 10/2005 | Saliga et al. |
| 2005/0285803 A1 | 12/2005 | Iacono et al. |
| 2006/0040675 A1 | 2/2006 | Halfmann et al. |
| 2006/0079287 A1 | 4/2006 | Ochi et al. |
| 2006/0172711 A1 | 8/2006 | King et al. |
| 2006/0209772 A1 | 9/2006 | Fang et al. |
| 2006/0234663 A1 | 10/2006 | Wilhoyte et al. |
| 2006/0240780 A1 * | 10/2006 | Zhu et al. ................. 455/63.4 |
| 2007/0117514 A1 | 5/2007 | Gainey et al. |
| 2007/0169151 A1 | 7/2007 | Vishloff et al. |
| 2007/0206537 A1 | 9/2007 | Cam-Winget et al. |
| 2008/0026797 A1 | 1/2008 | Nanda et al. |
| 2010/0150038 A1 | 6/2010 | Nanda et al. |
| 2010/0150077 A1 | 6/2010 | Nanda et al. |

FOREIGN PATENT DOCUMENTS

| | | |
|---|---|---|
| EP | 1482657 A2 | 12/2004 |
| JP | 8167871 A | 6/1996 |
| JP | 11150761 A | 6/1999 |
| JP | 11289287 A | 10/1999 |
| JP | 2003115851 A | 4/2003 |
| JP | 2003244054 A | 8/2003 |
| JP | 2003283420 A | 10/2003 |
| JP | 2004289328 A | 10/2004 |
| JP | 2004114457 A2 | 12/2004 |
| JP | 2005503061 A | 1/2005 |
| JP | 2005064671 A | 3/2005 |
| JP | 2005278052 A | 10/2005 |
| JP | 2005303903 A | 10/2005 |
| JP | 2006074085 A | 3/2006 |
| JP | 2007524272 A | 8/2007 |
| WO | 03023895 A2 | 3/2003 |

OTHER PUBLICATIONS

European Search Report—EP09011263—Search Authority—Munich—Nov. 27, 2009.

International Preliminary Report on Patentability—PCT/US07/070464, International Search Authority—European Patent Office—Jul. 30, 2008.

International Search Report—PCT/US07/070464, International Search Authority—European Patent Office—Oct. 23, 2007.

Li, G., et al., "Opportunities and Challenges for Mesh Networks Using Directional Antennas," Proceedings of the First IEEE Workshop Wireless Mesh Networks (WiMesh '05), 2005, pp. 1-11.

Taiwan Search Report—TW096120420—TIPO—Jun. 22, 2011.

Written Opinion—PCT/US07/070464, International Search Auhtority—European Patent Office—Oct. 23, 2007.

Young-Bae Ko et al: "Medium access control protocols using directional antennas in ad hoc networks" INFOCOM 2000. Nineteenth Annual Joint Conference of the IEEE Computer and Communications Societies. Proceedings. IEEE Tel Aviv, Israel Mar. 26-30, 2000, Piscataway, NJ, USA,IEEE, US, vol. 1, Mar. 26, 2000, pp. 13-21, XP010376001 ISBN: 0-7803-5880-5.

* cited by examiner

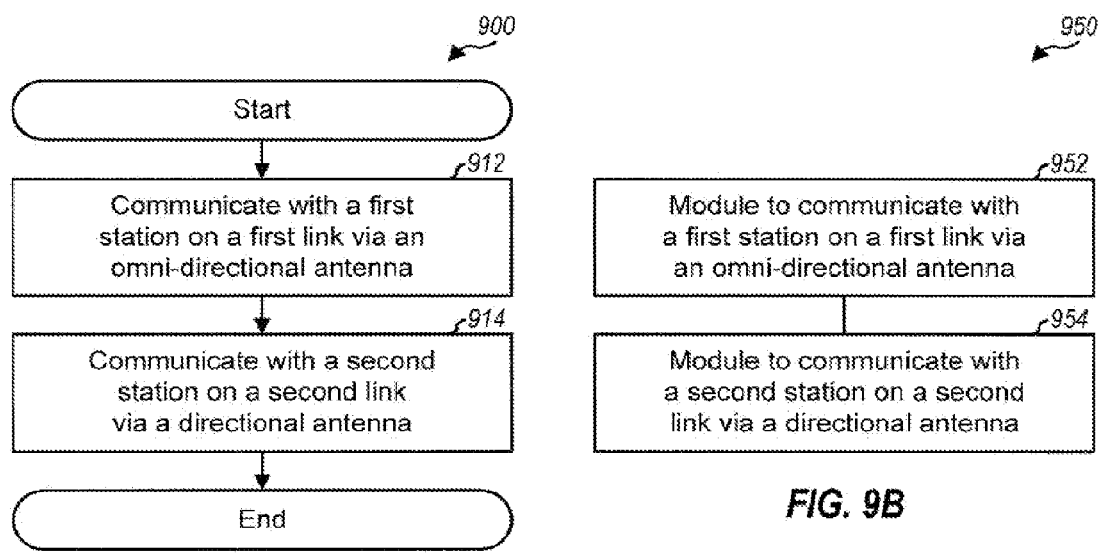

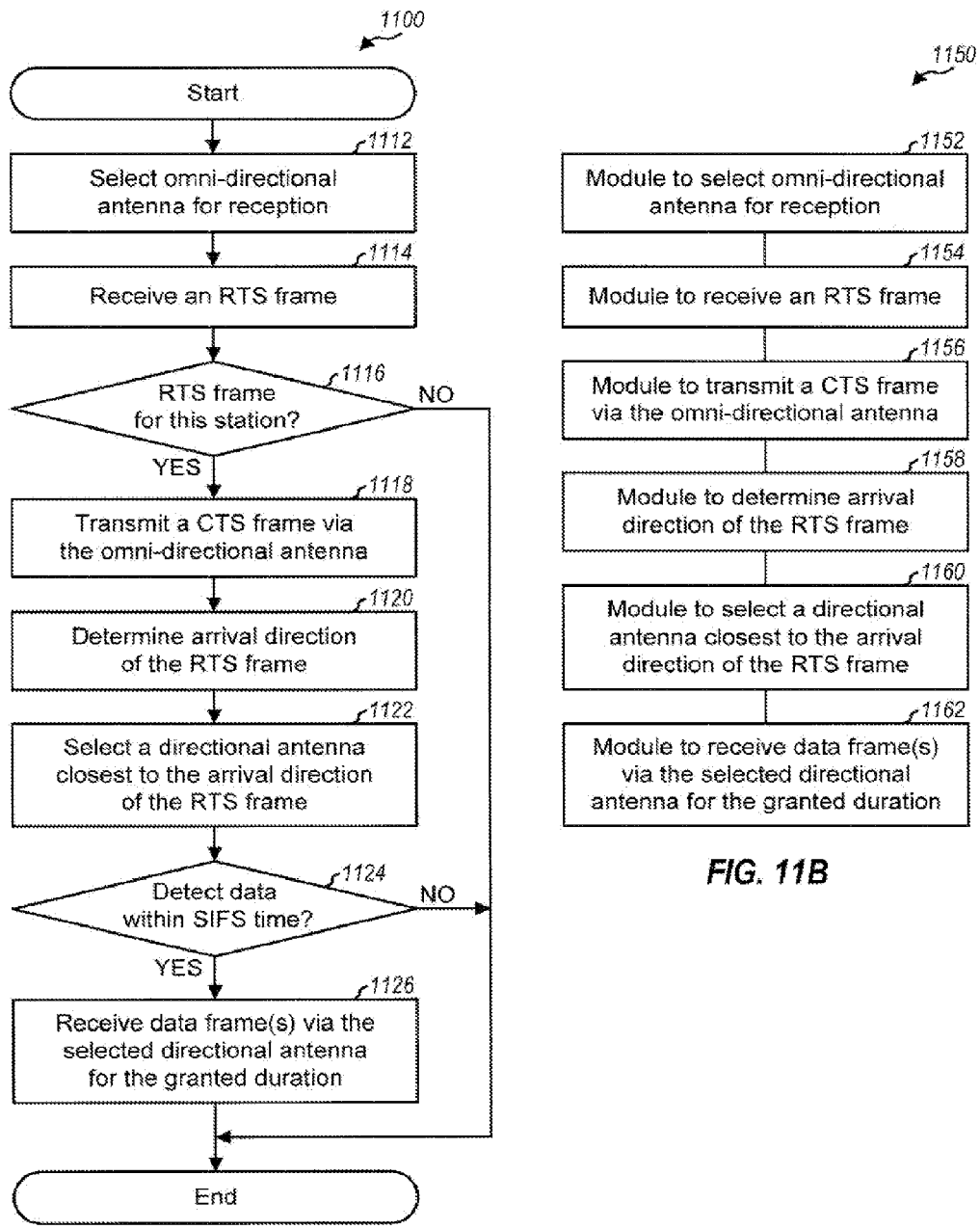

APPARATUS AND METHOD FOR WIRELESS COMMUNICATION VIA AT LEAST ONE OF DIRECTIONAL AND OMNI-DIRECTION ANTENNAS

CLAIM OF PRIORITY UNDER 35 U.S.C. 119

The present application is a divisional of pending patent application Ser. No. 12/712,715 entitled "APPARATUS AND METHOD FOR WIRELESS COMMUNICATION VIA AT LEAST ONE OF DIRECTIONAL AND OMNI-DIRECTION ANTENNAS" filed on Feb. 25, 2010 which is a divisional of patent application Ser. No. 11/758,578 entitled "APPARATUS AND METHOD FOR WIRELESS COMMUNICATION VIA AT LEAST ONE OF DIRECTIONAL AND OMNI-DIRECTION ANTENNAS" filed Jun. 5, 2007, which issued as U.S. Pat. No. 8,175,532 and which claims priority to Provisional Application Ser. No. 60/811,578, entitled "DIRECTIONAL ANTENNA UTILIZATION IN WIRELESS MESH NETWORKS," filed Jun. 6, 2006, assigned to the assignee hereof, and wherein patent application Ser. No. 12/712,715 and Provisional Application Ser. No. 60/811,578 are expressly incorporated by reference in their entirety.

FIELD

The present disclosure relates generally to communication, and more specifically to data transmission and reception in a wireless communication network.

BACKGROUND

A wireless communication network may include many stations that may communicate with one another via a wireless medium. Each station may be stationary or mobile and may be located anywhere within the wireless network. A given station A may exchange data with another station B, and each station may not know the whereabouts of the other station at the time of the data exchange. Station A may transmit in all directions to improve the likelihood of successful reception by station B. Similarly, station B may receive from all directions to improve the likelihood of receiving the transmission from station A. However, the omni-directional transmission from station A may cause interference to other stations in the vicinity. Similarly, the omni-directional reception by station B may result in reception of more interference from other stations. The interference caused by station A and the interference received by station B may adversely impact the performance of all affected stations.

There is therefore a need in the art for techniques to improve performance of data transmission and reception in a wireless communication network.

SUMMARY

Techniques for using at least one of omni-directional and directional antennas for communication are described herein. A directional antenna is an antenna that can transmit and/or receive data via a beamwidth that is less than 360°, e.g., from 10° to 120°. An omni-directional antenna is an antenna that can transmit and/or receive data via all or most of 360°. An omni-directional antenna may be a specially designed antenna or may be formed or synthesized with multiple directional antennas.

In an aspect, a station may be equipped with antenna elements selectable for communication as an omni-directional antenna or one or more directional antennas, which may be implemented in various manners as described below. From the antenna elements, the station may select the omni-directional antenna or a directional antenna for use for communication based on various factors such as, e.g., whether the location or direction of a target station for communication is known, whether control frames or data frames are being exchanged, etc. In another aspect, the station may select a particular directional antenna from among multiple directional antennas available for use in various manners. For example, the station may estimate received signal strength or received signal quality of a transmission from the target station for each of the multiple directional antennas and may select the directional antenna with the highest received signal strength or quality. The station may also select the directional antenna based on the location or direction of the target station, which may be known a priori or determined based on any positioning techniques.

In one specific design that is applicable for IEEE 802.11, the station uses an omni-directional antenna and a directional antenna for communicating a Request to Send and Clear to Send (RTS/CTS) with the target station. The station may receive a RTS frame from the target station via the omni-directional antenna and may select a directional antenna, e.g., based on the arrival direction of the RTS frame. The station may send a CTS frame to the target station via the omni-directional antenna. The station may then receive one or more data frames from the target station via the selected directional antenna for a duration indicated by the RTS frame. The station may switch back to the omni-directional antenna after this duration.

Various aspects and features of the disclosure are described in further detail below.

BRIEF DESCRIPTION OF THE DRAWINGS

FIGS. 9A and 9B show a process and an apparatus, respectively, for operating a station on two links.
FIGS. 11A and 11B show a process and an apparatus, respectively, for receiving data frames in an RTS/CTS exchange.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways.

For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The techniques described herein may be used for various wireless communication networks such as wireless local area networks (WLANs), wireless metropolitan area networks (WMANs), wireless wide area networks (WWANs), wireless mesh networks, etc. The terms "networks" and "systems" are often used interchangeably. A WLAN may implement any of the radio technologies in the IEEE 802.11 family of standards, Hiperlan, etc. A WMAN may implement IEEE 802.16, etc. A WWAN may be a cellular network such as a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. Certain aspects of the techniques are described below for wireless networks that implement IEEE 802.11.

Figure 1:
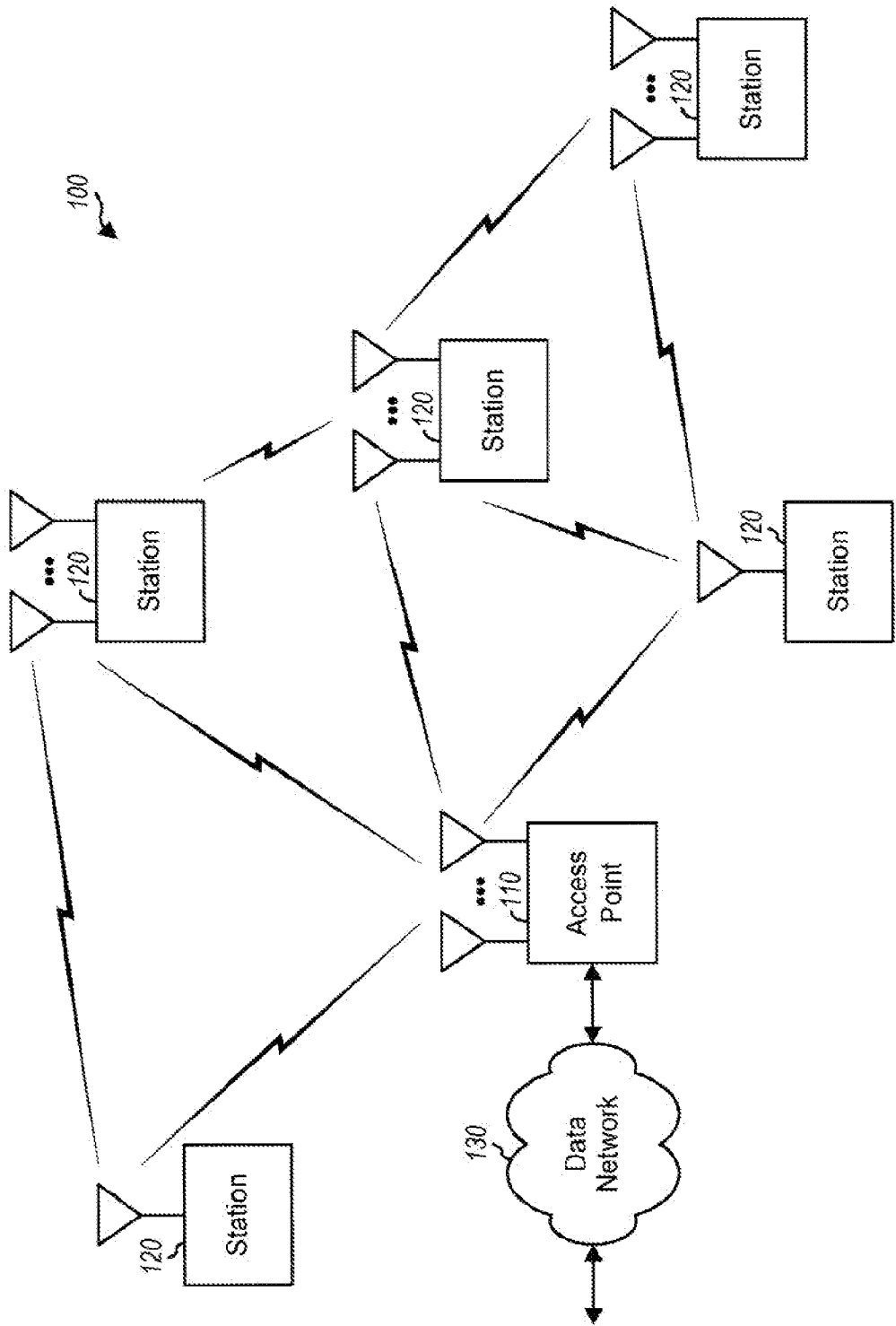
FIG. 1 shows a wireless local area network (WLAN).

FIG. 1 shows a WLAN 100 with an access point 110 and multiple stations 120. In general, a WLAN may include any number of access points and any number of stations. A station is a device that can communicate with another station via a wireless medium. A station may also be referred to as a terminal, a mobile station, a user equipment, a subscriber station, etc. A station may be a cellular phone, a handheld device, a wireless device, a personal digital assistant (PDA), a laptop computer, a wireless modem, a cordless phone, etc. An access point is a station that provides access to distribution services via the wireless medium for stations associated with that access point. An access point may also be referred to as a base station, a base transceiver station (BTS), a Node B, etc. Stations 120 may communicate with access point 110 and/or with one another via peer-to-peer communication. Access point 110 may couple to a data network 130 and may communicate with other devices via the data network. Data network 130 may be the Internet, an intranet, or some other wired or unwired network.

Figure 2:
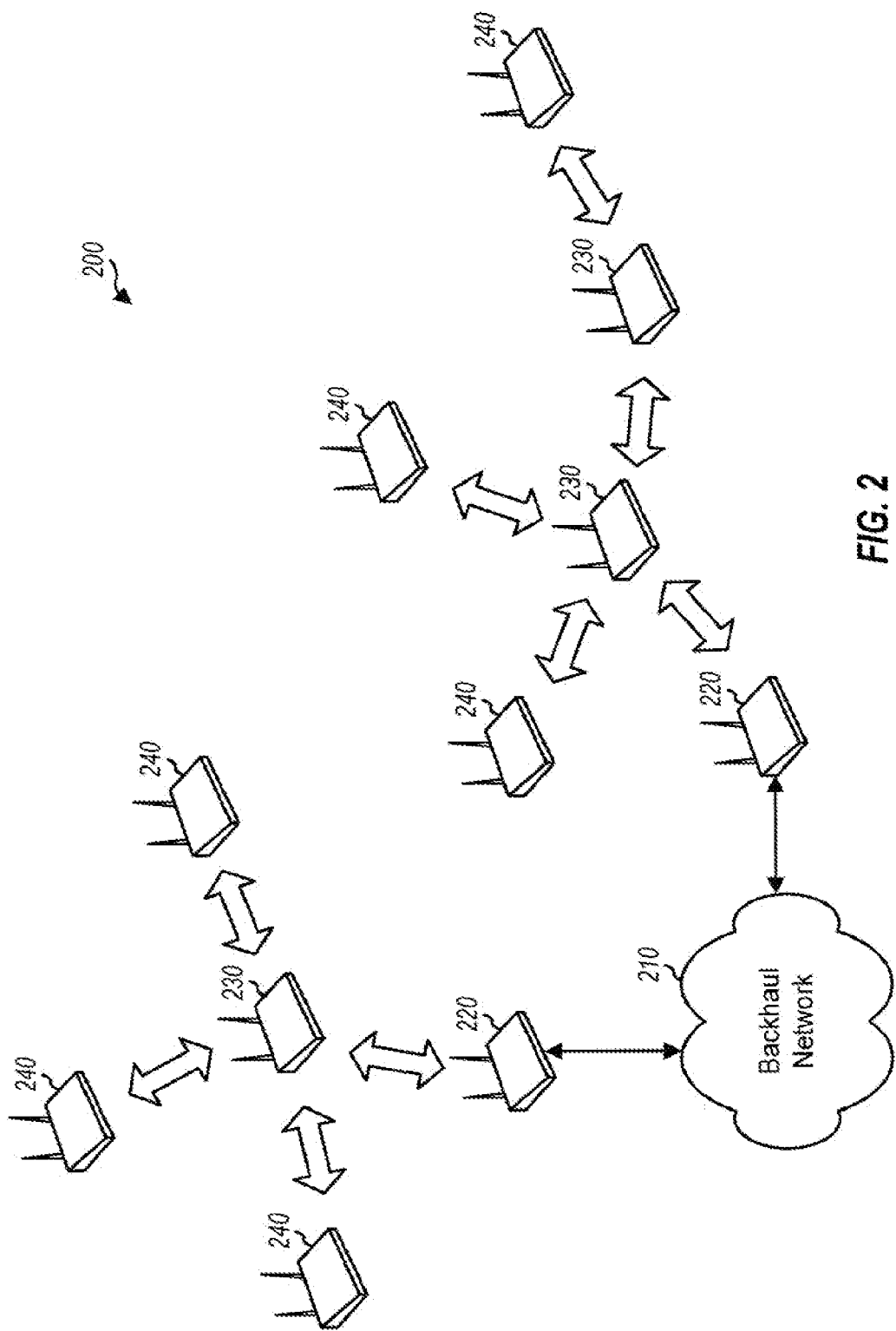
FIG. 2 shows a wireless mesh network.

FIG. 2 shows a wireless mesh network 200 that may be deployed over an area such as, e.g., a campus area, an urban center, a mall, or some other hot zone typically characterized by higher population density. Wireless mesh network 200 may operate in accordance with an IEEE 802.11 radio technology or some other radio technology. Wireless mesh network 200 includes a number of nodes, which are referred to as mesh points 220, 230 and 240. Mesh points 220 and 230 may forward traffic for other mesh points. Mesh points 240 are leaf mesh points that do not forward traffic for other mesh points.

In general, each mesh point may be a station or an access point. In the example shown in FIG. 2, mesh points 220 and 230 may be access points, and mesh points 240 may be leaf stations and/or access points. Access points 220 may be connected directly to a backhaul network 210, which may be a wired infrastructure acting as the backbone for wireless mesh network 200. Deployment and operating costs may be reduced by having only a subset of the access points connected directly to backhaul network 210. Access points 230 may communicate with one another and/or with access points 220 via inter-access point mesh communication in order to exchange traffic via backhaul network 210. Access points 230 may act as entities that forward traffic to access points 220. Leaf stations 240 may communicate with access points 220 and/or 230.

In mesh network 200, a frame of data (or a packet) may flow from a source to a destination via a route that may consist of one or more mesh points. A routing algorithm may be used to determine a sequence of mesh points for the frame to pass through to reach the destination. In certain situations, an access point may be congested and may request other access points that forward traffic to the congested access point to slow down in order to decongest the network.

Figure 3:
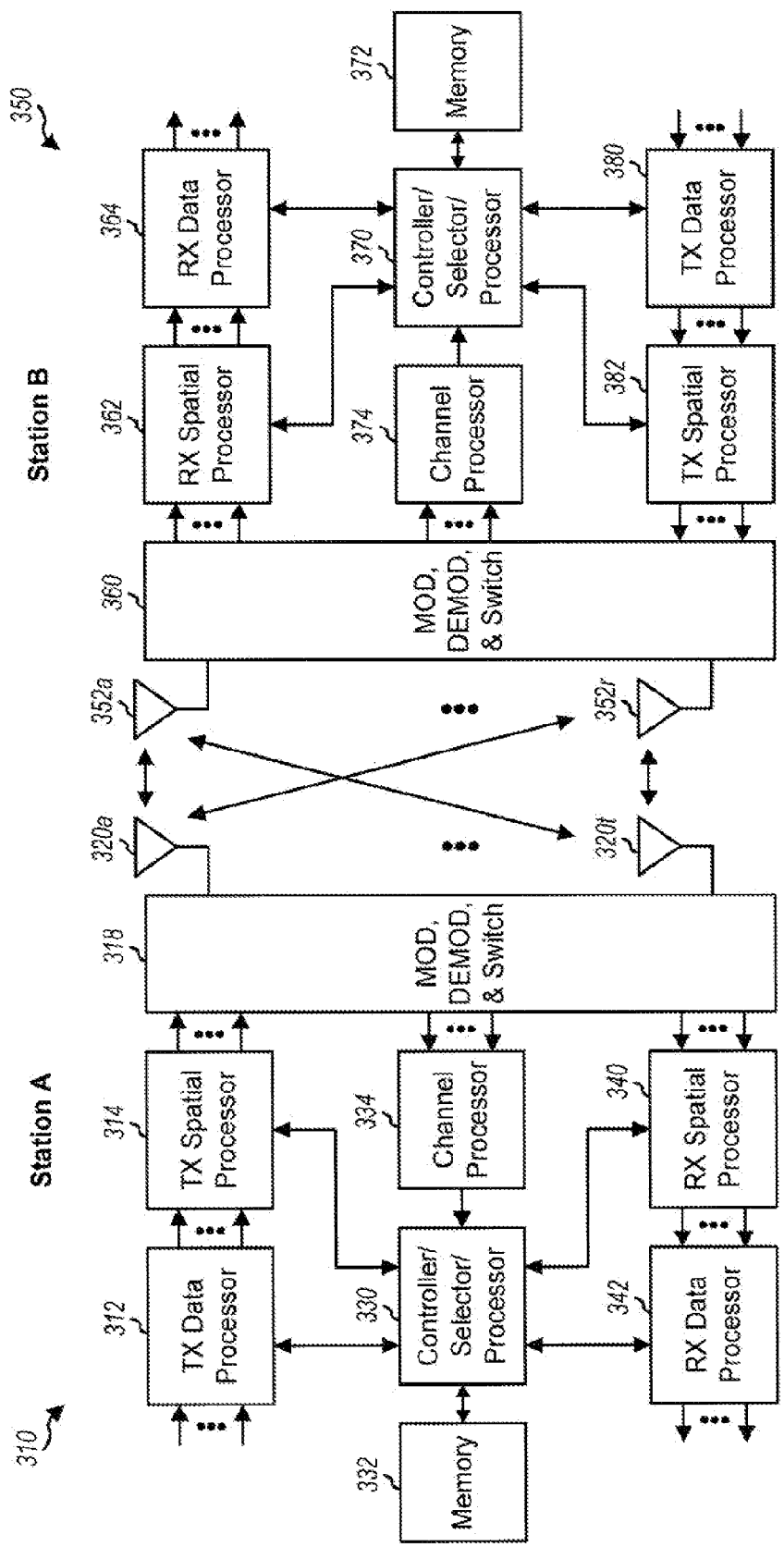
FIG. 3 shows a block diagram of two stations in a wireless network.

FIG. 3 shows a block diagram of a design of two stations 310 and 350 in a wireless network. For WLAN 100 in FIG. 1, station 310 may be access point 110, and station 350 may be one of stations 120. Station 310 may also be one of stations 120, and station 350 may be access point 110. For mesh network 200 in FIG. 2, stations 310 and 350 may each be mesh point 220, 230 or 240. In general, a "station" in the description herein may be either a station (STA) that does not provide access to distribution services or an access point (AP) that provides access to distribution services.

Station 310 may use multiple (T) antenna elements 320a through 320t for data transmission and reception. Station 350 may use multiple (R) antenna elements 352a through 352r for data transmission and reception. In general, T and R may each be any integer value. In some designs, T and R may each be equal to 2 or 4. The antenna elements at each station may be used to synthesize omni-directional and directional antennas, as described below.

At station 310, a transmit (TX) data processor 312 may receive traffic data from a data source (not shown) and/or other data from a controller/selector/processor 330. TX data processor 312 may process (e.g., format, encode, interleave, and symbol map) the received data and generate data symbols, which are modulation symbols for data. A TX spatial processor 314 may multiplex the data symbols with pilot symbols, perform transmit spatial processing if applicable, and provide T streams of output symbols to a modulator (MOD), demodulator (DEMOD), and switch unit 318. Unit 318 may perform modulation on each output symbol stream (e.g., for OFDM, etc.) and generate an output chip stream. Unit 318 may further condition (e.g., convert to analog, amplify, filter, frequency upconvert, and power amplify) each output chip stream to generate a radio frequency (RF) signal. Unit 318 may route T RF signals to T antenna elements 320a through 320t, which may transmit these RF signals.

At station 350, R antenna elements 352a through 352r may receive the RF signals transmitted by station 310, and each antenna 352 may provide a received signal to a modulator, demodulator, and switch unit 360. Unit 360 may process (e.g., demodulate and condition) each received signal in a manner complementary to the processing performed by unit 318 to obtain received symbols. A receive (RX) spatial processor 360 may perform spatial matched filtering on the received symbols from all R antenna elements 352a through 352r and provide data symbol estimates, which are estimates of the data symbols transmitted by station 310. An RX data processor 362 may further process (e.g., symbol demap, deinterleave, and decode) the data symbol estimates and provide decoded data to a data sink (not shown) and/or a controller/selector/processor 370.

A channel processor 374 may process the received symbols from unit 360 to derive a channel estimate for station 310, received signal strength and/or received signal quality for a received transmission, an interference estimate, etc. Processor 374 may derive spatial filter matrices used by RX spatial processor 360 for spatial matched filtering. Processor 374 may also derive transmit steering matrices used by TX spatial processor 314 for transmission. Processor 374 may also determine other characteristics of the wireless medium and/or received transmission, as described below.

The processing for transmission from station 350 to station 310 may be the same as or different from the processing for transmission from station 310 to station 350. At station 350, traffic data from a data source (not shown) and/or other data (e.g., feedback information) from controller/selector/processor 370 may be processed (e.g., encoded, interleaved, and symbol mapped) by a TX data processor 380, multiplexed with pilot symbols and spatially processed by a TX spatial processor 382, and further processed (e.g., modulated and conditioned) by unit 360 to generate R RF signals, which may be transmitted via antenna elements 352a through 352r.

At station 310, the RF signals transmitted by station 350 may be received by antenna elements 320a through 320t and processed by unit 318 to obtain received symbols. The received symbols may be processed (e.g., spatial matched filtered) by an RX spatial processor 340 and further processed (e.g., symbol demapped, deinterleaved, and decoded) by an RX data processor 342 to obtain decoded data. A channel processor 334 may process the received symbols from unit 318 to derive a channel estimate for station 350, received signal strength or received signal quality for a received transmission, an interference estimate, etc. Processor 334 may derive spatial filter matrices, transmit steering matrices, etc., based on the channel estimate. Processor 334 may also determine other characteristics of the wireless medium and/or received transmission.

Controllers/selectors/processors 330 and 370 may control the operation at stations 310 and 350, respectively. For example, controllers/selectors/processors 330 and 370 may select an omni-directional antenna or a directional antenna for use for communication. Memories 332 and 372 may store data and program codes for stations 310 and 350, respectively.

In an aspect, a station may be equipped with an omni-directional antenna and one or more directional antennas that may be used for data transmission and/or reception. In general, an antenna may comprise a single antenna element or a collection of antenna elements. The omni-directional and directional antennas may be implemented with various designs. These antennas may be formed with different antenna elements or may share common antenna elements. The omni-directional and directional antennas may also be selected for use in various manners.

Figure 4A:
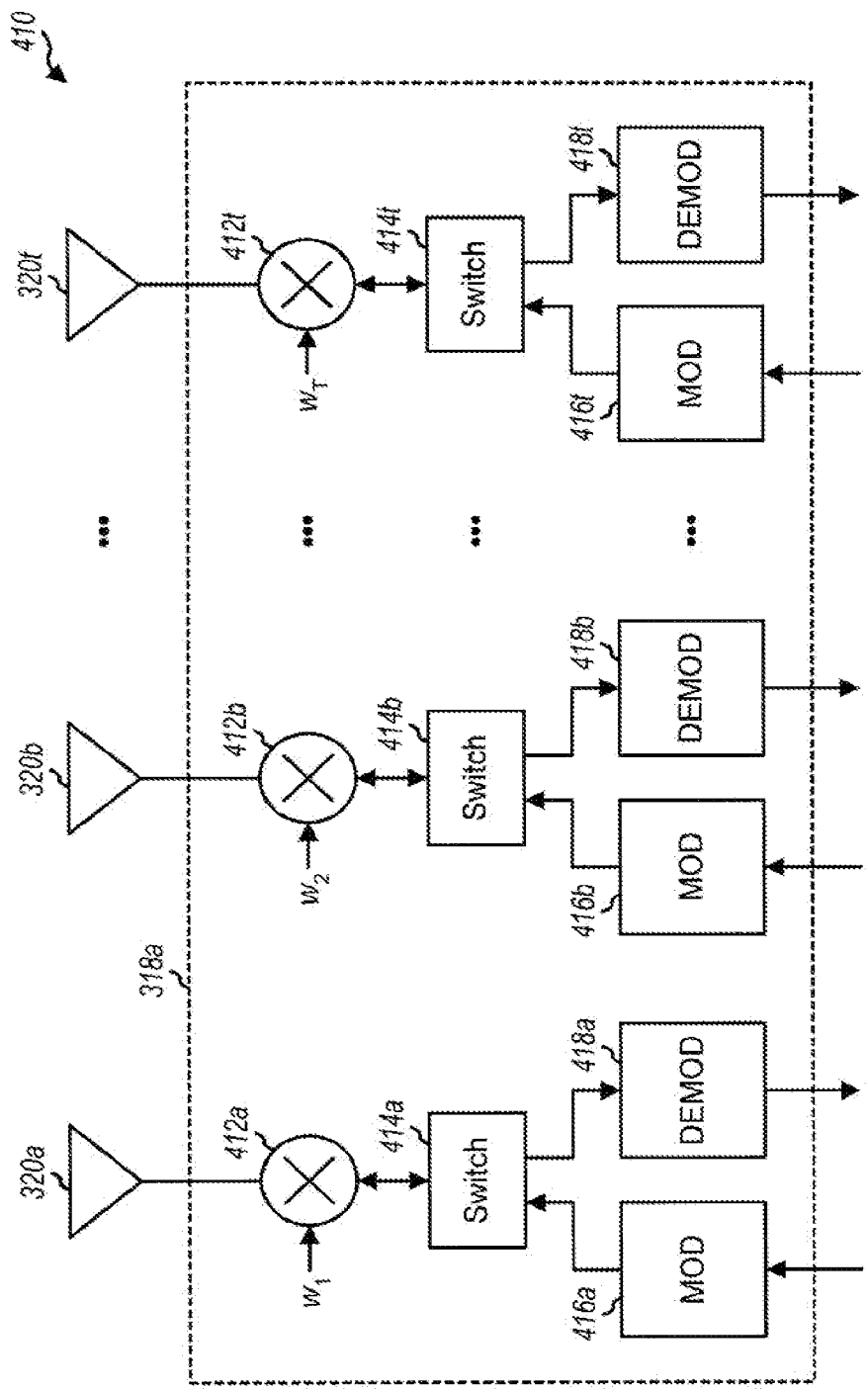
FIGS. 4A, 4B and 4C show three designs of omni-directional and directional antennas.

FIG. 4A shows a block diagram of a design 410 of omni-directional and directional antennas for station 310 in FIG. 3. In this design, station 310 includes T antenna elements 320a through 320t coupled to a unit 318a, which is one design of unit 318 in FIG. 3.

In the design shown in FIG. 4A, each antenna element 320 is associated with a multiplier 412, a switch 414, a modulator 416, and a demodulator 418. For data transmission via antenna element 320a, modulator 416a provides a modulated signal to switch 414a, which routes the signal to multiplier 412a. Multiplier 412a multiplies the modulated signal with a weight $w_1$ and provides an RF signal to antenna 320a. For data reception via antenna element 320a, multiplier 320a multiplies a received signal from antenna element 320a with the weight $w_1$ and provides a scaled signal. Switch 414a routes the scaled signal from multiplier 412a to demodulator 418a. The signals for each of antenna elements 320b through 320t may be routed and scaled in similar manner as the signals for antenna element 320a.

The weights $w_1$ through $w_T$ may be selected to synthesize an omni-directional beam or a directional beam with antenna elements 320a through 320t. The weights may be dependent on the design and placement of antenna elements 320a through 320t, the desired beam, and possibly other factors.

The weights may be determined based on computer simulation, empirical measurements, etc. The weights $w_1$ through $w_T$ may be applied to RF signals as shown in FIG. 4A or on analog signals within modulators 416 and demodulators 418. The weights $w_1$ through $w_T$ may also be applied to digital signals in the transmit path by TX spatial processor 314 in FIG. 3 and/or to digital signals in the receive path by RX spatial processor 340.

In general, antenna elements 320a through 320t may be used to synthesize any number of directional antennas. In one design, antenna elements 320a through 320t are used to synthesize three directional antennas that point outwardly with approximately 120° of separation. The beam for each directional antenna may have a beamwidth of over 120° and may overlap adjacent beams at the edges. Fewer or more directional antennas may also be synthesized. In general, antenna elements 320a through 320t may be used to synthesize any number of directional antennas that may point at specific directions (e.g., 120° apart) or may be spaced apart in small angle increments.

Figure 4B:
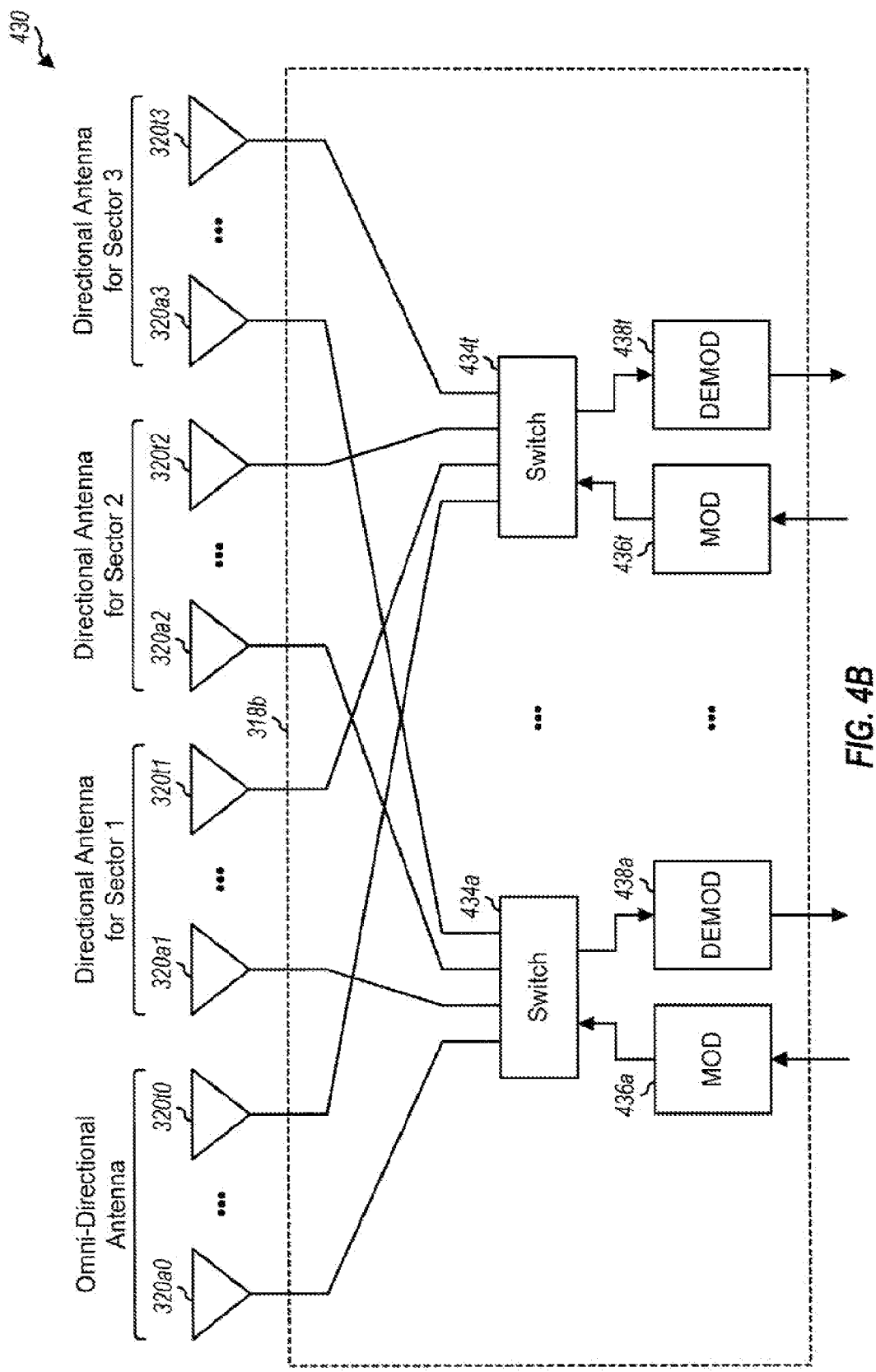

FIG. 4B shows a block diagram of a design 430 of omni-directional and directional antennas for station 310 in FIG. 3. In this design, station 310 includes four sets of T antenna elements coupled to a unit 318b, which is another design of unit 318 in FIG. 3. The first set includes T antenna elements 320a0 through 320t0 for an omni-directional antenna. The second set includes T antenna elements 320a1 through 320t1 for a directional antenna for sector 1. The third set includes T antenna elements 320a2 through 320t2 for a directional antenna for sector 2. The fourth set includes T antenna elements 320a3 through 320t3 for a directional antenna for sector 3. The three directional antennas for the three sectors may point outwardly with approximately 120° of separation, and each directional antenna may have a beamwidth of over 120°. Each set of antenna elements may be designed to achieve the desired beam for the corresponding omni-directional or directional antenna. Improved performance may be achieved by using a different set of antenna elements for each antenna beam.

One of the four sets of antenna elements may be selected for use for communication. The selected set of T antenna elements may correspond to antenna elements 320a through 320t in FIG. 3.

Unit 318b includes T switches 434a through 434t, T modulators 436a through 436t, and T demodulators 438a through 438t. Switch 434a couples to four antenna elements 320a0, 320a1, 320a2 and 320a3 in the four sets and further to modulator 436a and demodulator 438a. For data transmission, switch 434a couples the modulated signal from modulator 436a to an antenna element in the selected set. For data reception, switch 434a couples the received signal from the antenna element in the selected set to demodulator 438a. The switches, modulators, and demodulators for the other antenna elements may be coupled and operated in similar manner as switch 434a, modulator 436a, and demodulator 438a.

Figure 4C:
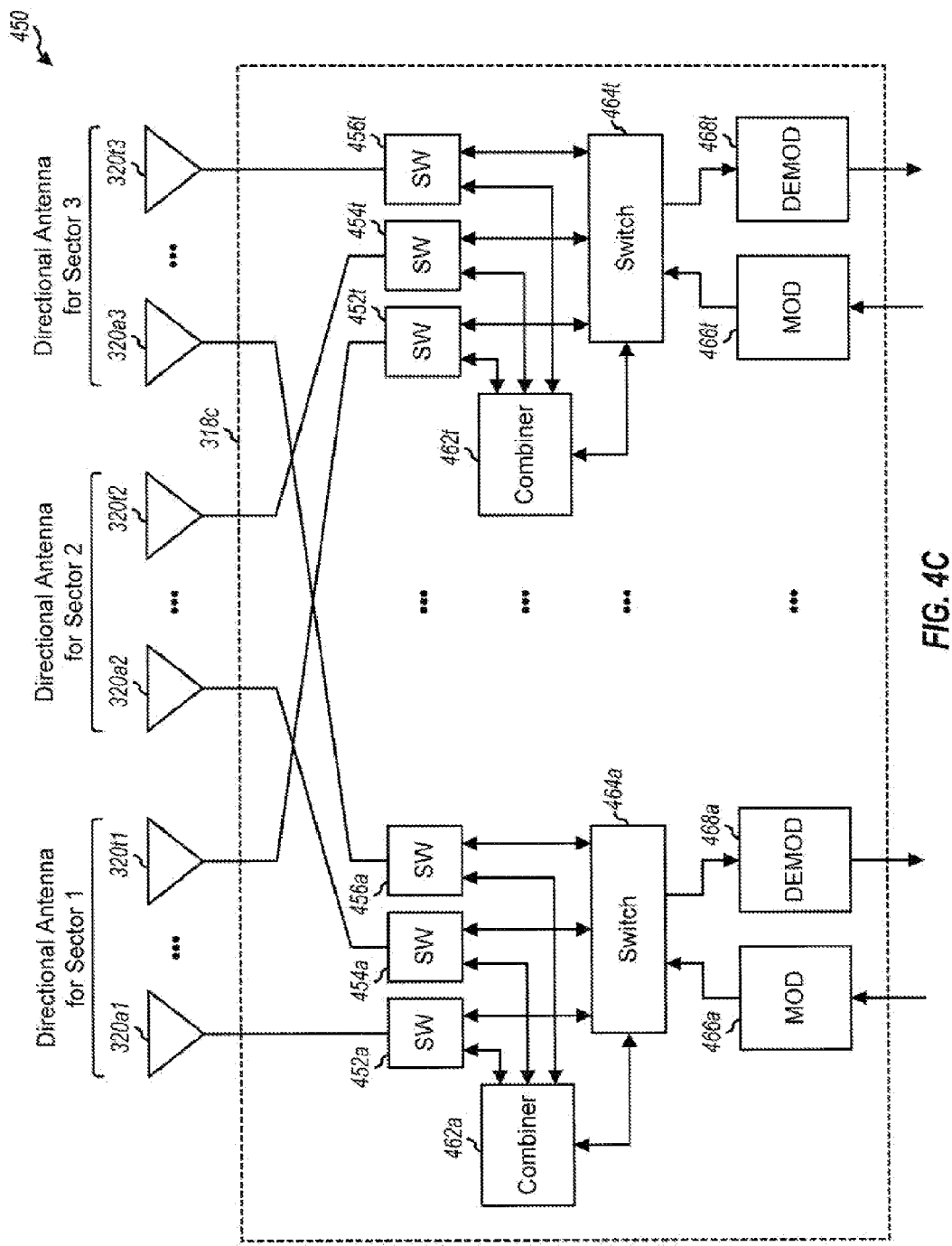

FIG. 4C shows a block diagram of a design 450 of omni-directional and directional antennas for station 310 in FIG. 3. In this design, station 310 includes three sets of T antenna elements coupled to a unit 318c, which is yet another design of unit 318 in FIG. 3. The first set includes T antenna elements 320a1 through 320t1, the second set includes T antenna elements 320a2 through 320t2, and the third set includes T antenna elements 320a3 through 320t3, which are as described above for FIG. 4B. One of the three sets of antenna elements may be selected for a directional antenna, or all three sets may be selected for the omni-directional antenna. A virtual antenna may be formed by combining three antenna elements in the three sets, e.g., antenna elements 320a1, 320a2 and 320a3.

Unit 318c includes T sets of circuitry, with each circuitry set including switches 452, 454 and 456, a combiner 462, a switch 464, a modulator 466, and a demodulator 468. Switch 452a couples antenna element 320a1 to combiner 462a if the omni-direction antenna is selected and to switch 464a if the directional antenna for sector 1 is selected. Switch 452b couples antenna element 320a2 to combiner 462a if the omni-direction antenna is selected and to switch 464a if the directional antenna for sector 2 is selected. Switch 452c couples antenna element 320a3 to combiner 462a if the omni-direction antenna is selected and to switch 464a if the directional antenna for sector 3 is selected. For data transmission, combiner 462a receives the signal from switch 464a and provides the signal to switches 452a, 452b and 452c. For data reception, combiner 462a combines the received signals from switches 452a, 452b and 452c and provides the combined signal to switch 464a. For data transmission, switch 464a couples the modulated signal from modulator 466a to switch 452a, 452b or 452c or combiner 462a. For data reception, switch 434a couples the signal from switch 452a, 452b or 452c or combiner 462a to demodulator 438a. The switches, combiners, modulators, and demodulators for the other antenna elements may be coupled and operated in similar manner as those for the first antenna element.

In another design, station 310 includes (1) a first set of at least one antenna for communication with other stations in the wireless network and (2) a second set of at least one antenna for communication with another network, e.g., a backhaul network. The first antenna set may be designed for a first frequency band, e.g., 2.4 GHz or 5 GHz used for IEEE 802.11, or some other frequency band. The second antenna set may be designed for a second frequency band, e.g., 3.5 GHz or some other frequency band. An antenna set may include both omni-directional and directional antennas and may be implemented as shown in FIG. 4A, 4B, or 4C. Alternatively, an antenna set may include just an omni-directional antenna. In one design, the first set includes just an omni-directional antenna while the second set includes both omni-directional and directional antennas. Separate transmit and receive circuitry may be used for the two antenna sets. In this case, station 310 may be able to simultaneously communicate with two stations via the two antenna sets, e.g., with a station in a mesh network via the first antenna set and with a mesh access point via the second antenna set.

Figure 5A:
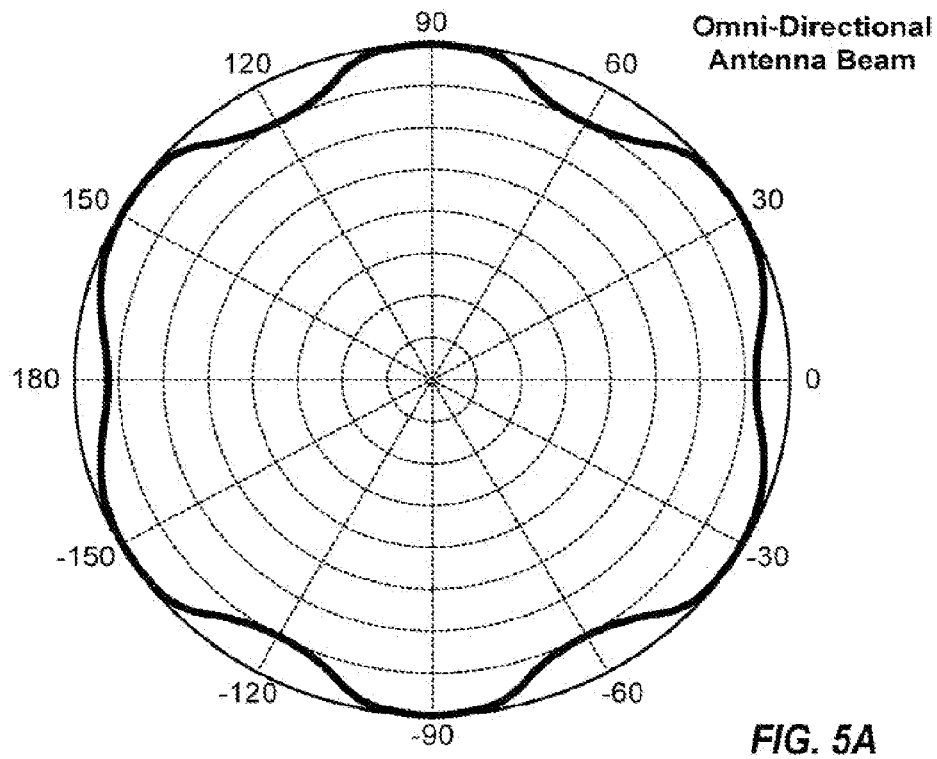
FIG. 5A shows an example omni-directional beam pattern.

FIG. 5A shows an example omni-directional beam pattern, which may be obtained with the antenna design shown in FIG. 4A, 4B or 4C. This omni-directional beam pattern has similar antenna gains for all spatial directions.

Figure 5B:
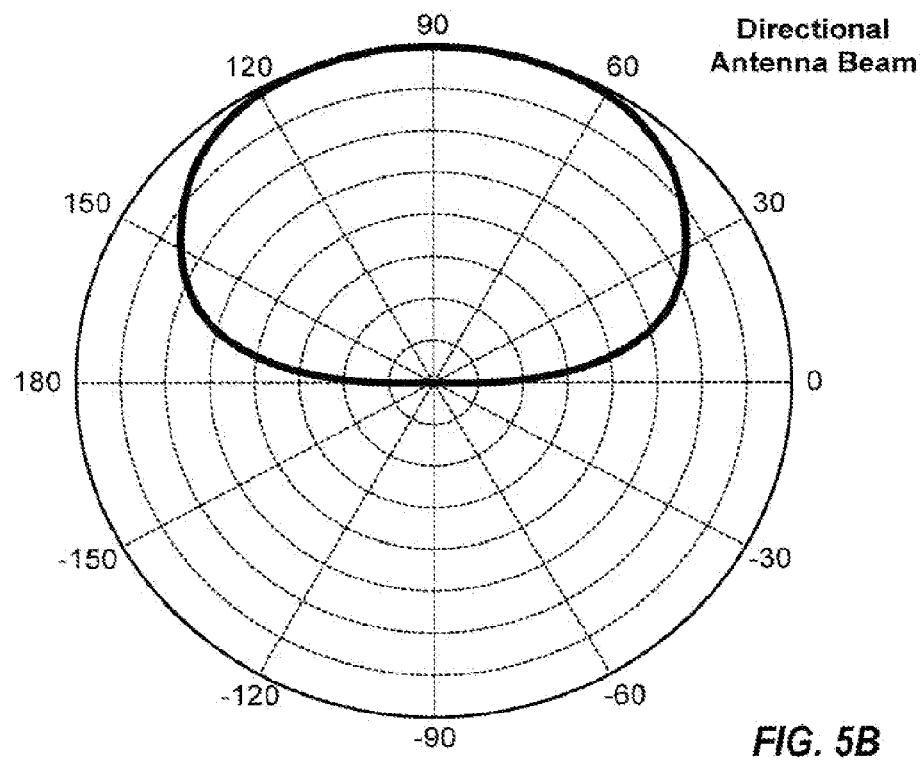
FIG. 5B shows an example directional beam pattern.

FIG. 5B shows an example directional beam pattern, which may be obtained with the antenna design shown in FIG. 4A, 4B or 4C. This directional beam pattern has high antenna gains across a beamwidth and small antenna gains outside of the beamwidth. The beamwidth may be selected based on the number of sectors being supported and the desired amount of overlap between directional beams.

FIGS. 4A to 4C show three example designs for omni-directional and directional antennas, which may be used for stations 310 and 350. The omni-directional and directional antennas may also be implemented with other designs. These antennas may also be implemented with any number of antenna elements. An antenna element may be a dipole antenna, a patch antenna, a microstrip antenna, a stripline antenna, a printed dipole antenna, an inverted F antenna, etc.

The following aspects may be applicable for communication between stations 310 and 350:

Antenna selection-refers to selection of the omni-directional antenna or a directional antenna for use for communication, Sector section-refers to selection of a particular directional antenna from among all directional antennas available for use at a station, and Rate selection-refers to selection of one or more data rates for transmission. For clarity, much of the following description is from the perspective of station 310. Station 350 is a target station, which is a station with which packets are exchanged, e.g., sent and/or received.

Antenna selection may be performed based on various criteria such as whether or not the location or direction of target station 350 is known, the type of information being sent or received, received signal strength/quality for target station 350, interference from other stations, etc. In one design, the omni-directional antenna is selected for use if the location or direction of target station 350 is not known or if multiple stations are being targeted. Station 310 may receive a frame from any station in the wireless network at any given moment. Station 310 may use the omni-directional antenna to receive frames from stations at unknown locations. Station 310 may also transmit frames to stations at unknown locations using the omni-directional antenna. Station 310 may also use the omni-directional antenna to send a given frame (e.g., a control frame) to multiple stations at known or unknown locations.

In one design, a directional antenna is selected for use if the location or direction of target station 350 is known. The location or direction of target station 350 may be ascertained based on a transmission sent by target station 350, a location estimate for target station 350, etc.

Station 310 may select the omni-directional or direction antenna for use for communication with target station 350 based on context. Station 310 may also select the omni-directional or direction antenna autonomously without input from target station 350. The use of a directional antenna, when possible, may increase spatial reuse in the wireless network, which may improve overall performance.

Sector selection may be performed in various manners. In one design, sector selection is performed based on received signal strength or received power. Station 310 may receive a transmission from target station 350 via each of the directional antennas available at station 310. Station 310 may determine the received signal strength for each directional antenna, e.g., by summing the received power of T received signals from T antenna elements for the directional antenna. Station 310 may sum the received power for each directional antenna in different manners for different antenna designs. For example, station 310 may synthesize different directional antennas with different sets of weights applied by RX spatial processor 340. In this case, station 310 may multiply the received symbols from unit 318 with a set of weights for each directional antenna to obtain output symbols for that directional antenna and may then determine the received signal strength for the directional antenna based on the output symbols. In any case, station 310 may select the directional antenna with the strongest received signal strength for use.

In another design, sector selection is performed based on received signal quality, which may be given by a signal-to-noise ratio (SNR), a signal-to-noise-and-interference ratio (SINR), a carrier-to-interference ratio (C/I), etc. Received signal quality takes into consideration the received power as well as noise and interference. Hence, received signal quality may be more suitable to select a data rate for data transmission. Station 310 may receive a transmission from target station 350 via each of the directional antennas. Station 310 may determine the received signal quality of the transmission for each directional antenna and may select the directional antenna with the highest received signal quality.

In yet another design, sector selection is performed based on prior information for target station 350. The location or direction of target station 350 may be ascertained, e.g., based on any of the designs described above. A directional antenna may be selected for station 350 and stored in memory. Thereafter, if the same target station 350 is encountered, the directional antenna selected previously for this station may be retrieved from memory and used for communication with the station. The retrieved directional antenna may be confirmed, e.g., based on received signal strength or received signal quality measurement made during the current communication, to ensure that the retrieved directional antenna is still the best one.

In yet another design, sector selection is performed based on a look-up table containing information on other stations in the wireless network. The information may comprise the location or direction of each station, the directional antenna applicable for each station, etc. The information may be updated whenever transmissions are received from the other stations.

Rate selection may be performed based on various factors such as the received signal quality, the antenna selected for use, the type of transmission being sent, interference estimate, etc. Different antennas may be associated with different antenna gains, which may be characterized and known a priori. One or more data rates may be selected by taking into account different antenna gains for different antennas used by stations 310 and 350.

Station 310 may use its antenna elements to send or receive a single-input single-output (SISO) transmission, a single-input multiple-output (SIMO) transmission, a multiple-input single-output (MISO) transmission, or a multiple-input multiple-output (MIMO) transmission. For SISO or SIMO, station 310 may send a single data stream via a single virtual antenna corresponding to a selected omni-directional or directional antenna. For MISO, station 310 may send a single data stream via multiple antenna elements for the selected antenna. For MIMO, station 310 may send multiple data streams simultaneously via multiple antenna elements. Each data stream may be sent from one antenna element in omni-direction. Each data stream may also be sent from all antenna elements with transmit steering, and hence on a directional/virtual antenna selected for that data stream. Different data streams may be sent with different transmit steering vectors and thus on different directional/virtual antennas.

Station 310 may estimate interference observed via the omni-directional antenna and each directional antenna. Station 310 may estimate the interference on a given antenna by measuring the received power for that antenna when no packets are sent or received by station 350, so that the received power may be attributed to transmissions from other stations. Since the other stations may transmit at any time, the interference may fluctuate over time and may be quantified by statistical parameters. In one design, the interference for a given antenna may be given by a cumulative density function (CDF) that indicates, for a given interference level x, the percentage of time the measured interference is below x. For example, the CDFs may indicate that the interference level is −85 dBm for 5% of the time for a directional antenna and −75 dBm for 5% of the time for the omni-directional antenna.

For data reception, station 310 may estimate the received signal quality of a transmission from target station 350. Station 310 may select a data rate based on the received signal quality, e.g., using a look-up table of data rate versus received signal quality. Station 310 may also apply a backoff based on an interference estimate. For example, station 310 may reduce the received signal quality by an amount determined by the interference estimate and may select a data rate based on the reduced received signal quality. For a MIMO transmission, station 310 may perform (1) rank selection to determine the number of data streams to send and (2) stream selection to determine which antenna element or which virtual antenna to use for each data stream. Station 310 may also perform rate selection to select a suitable data rate for each data stream or one common data rate for all data streams, based on the received signal quality and possibly interference estimate.

Station 310 may estimate the received signal quality of a transmission from station 350 based on the omni-directional antenna and may select a directional antenna for use. In this case, station 310 may adjust the received signal quality or the data rate to take into account the difference in element gains, antenna gains, and/or interference rejection for the omni-directional and directional antennas. Station 310 may also use a data rate determined from the omni-directional antenna as a lower bound for a data rate for the directional antenna.

Station 310 may select one or more data rates for one or more data streams based on the received signal quality, the difference in antenna gains, the interference estimate, etc. Station 310 may send the selected data rate(s) to station 350, which may send data at the selected data rate(s).

For data transmission, station 310 may send a transmission to target station 350, e.g., using the omni-directional antenna. Station 350 may estimate the received signal quality, select one or more data rates based on the received signal quality, and send the selected data rate(s) to station 310. If station 310 sends the initial transmission with the omni-directional antenna and selects a directional antenna for subsequent data transmission to station 350, then station 310 may adjust the data rate(s) received from station 350 to take into account the difference in element gains, antenna gains, and/or interference rejection for the omni-directional and directional antennas.

Station 310 may use the interference estimate to backoff the data rate(s). Station 310 may also use the interference estimate to select an antenna. For example, an antenna with less interference may be selected for use, or an antenna with excessive interference may be disqualified from use.

Figure 6A:
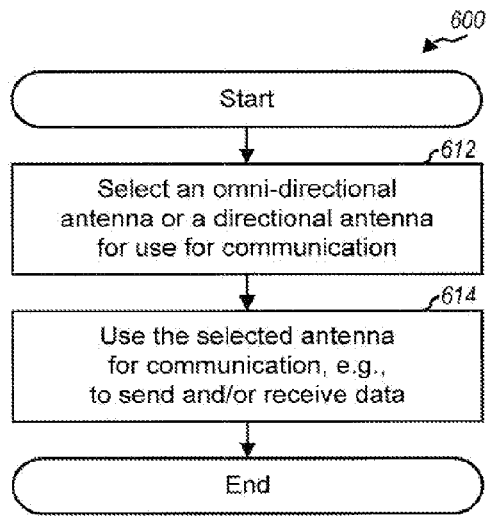
FIGS. 6A and 6B show a process and an apparatus, respectively, for antenna selection.

FIG. 6A shows a design of a process 600 for antenna selection. Process 600 may be performed by a station, e.g., an access point or a station in IEEE 802.11 WLAN or mesh network. An omni-directional antenna or a directional antenna may be selected for use for communication (block 612). The antenna selection in block 612 may be performed in various manners and based on various factors. In one design, the omni-directional antenna may be selected if the location or direction of a target station for communication is unknown, and the directional antenna may be selected if the location or direction of the target station is known. In another design, the omni-directional antenna may be selected for control frames, and the directional antenna may be selected for data frames and if the location or direction of the target station is known. The directional antenna may be selected from among multiple (e.g., three) directional antennas available for use or may be synthesized based on a transmission received from the target station. The selected antenna may be used for communication, e.g., to send and/or receive data (block 614).

The omni-directional and directional antennas may be obtained in various manners. In one design, a set of antenna elements may be usable for communication. The omni-directional and directional antennas may be synthesized with this set of antenna elements, e.g., as shown in FIG. 4A. In another design, the omni-directional antenna may be implemented with at least one antenna element, and at least one directional antenna may be implemented with at least one set of antenna elements, e.g., as shown in FIG. 4B. In yet another design, multiple directional antennas may be implemented with multiple sets of antenna elements, and the omni-directional antenna may be formed with the multiple sets of antenna elements, e.g., as shown in FIG. 4C. The omni-directional and directional antennas may be implemented or synthesized in other manners.

Figure 6B:
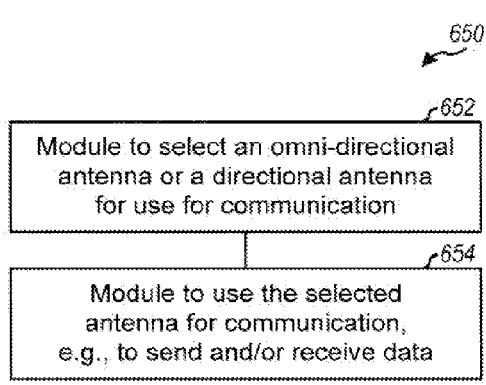

FIG. 6B shows a design of an apparatus 650 for antenna selection. Apparatus 650 includes means for selecting an omni-directional antenna or a directional antenna for use for communication (module 652), and means for using the selected antenna for communication, e.g., to send and/or receive data (module 654). Modules 652 and 654 may comprise one or more integrated circuits (ICs), processors, electronics devices, hardware devices, electronics components, logical circuits, memories, etc., or any combination thereof.

Figure 7:
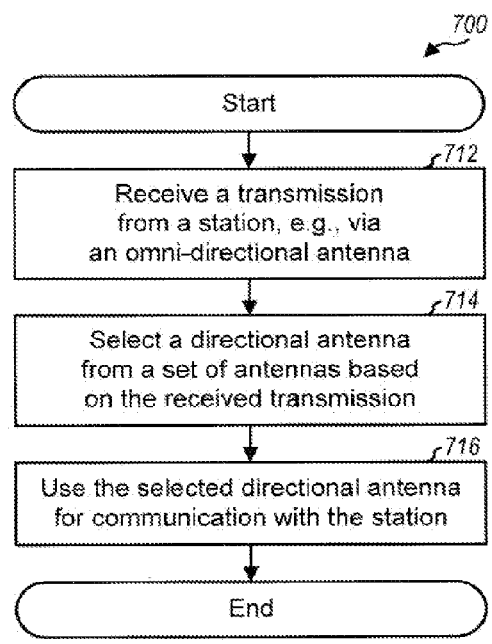
FIG. 7 shows a process for sector selection.

FIG. 7 shows a design of a process 700 for sector selection. A transmission (e.g., for a control frame) may be received from a station (block 712). The transmission may be received via an omni-directional antenna, which may be a true omni-directional antenna or synthesized with multiple directional antennas, e.g., by receiving the transmission via all of these directional antennas. A directional antenna may be selected from a set of antennas based on the received transmission (block 714). The set of antennas may comprise only directional antennas or both omni-directional and directional antennas. Multiple directional antennas may be implemented with different sets of antenna elements (e.g., as shown in FIGS. 4B and 4C) or may be synthesized based on a single set of antenna elements (e.g., as shown in FIG. 4A). In one design, the direction of arrival of the transmission may be determined The directional antenna that is closest to the arrival direction of the transmission may be selected from among multiple directional antennas available for use. In another design, at least one antenna element may be tuned to the arrival direction of the transmission. In yet another design, the received signal strength of the transmission may be determined for each of the multiple directional antennas, and the directional antenna with the highest received signal strength may be selected. In yet another design, the received signal quality of the transmission may be determined for each of the multiple directional antennas, and the directional antenna with the highest received signal quality may be selected. The directional antenna may also be selected based on an interference estimate.

The selected directional antenna may be used for communication with the station (block 716). For data reception, at least one data frame may be received from the station via the selected directional antenna. For data transmission, at least one data frame may be sent to the station via the selected directional antenna.

Figure 8:
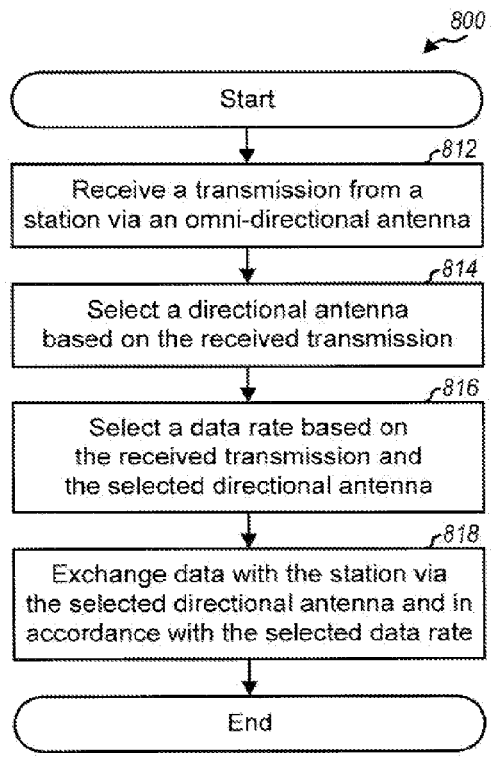
FIG. 8 shows a process for rate selection.

FIG. 8 shows a design of a process 800 for rate selection. A transmission from a station may be received via an omni-directional antenna (block 812). A directional antenna may be selected based on the received transmission (block 814). A data rate may be selected based on the received transmission and the selected directional antenna (block 816). Data may be exchanged with the station via the selected directional antenna and in accordance with the selected data rate (block 818).

For block 816, the received signal quality of the transmission may be estimated. Interference for the selected directional antenna may also be estimated. The difference between the antenna gain of the omni-directional antenna and the antenna gain of the selected directional antenna may be determined The data rate may be selected based on the received signal quality, the interference estimate, the difference in antenna gains, or any combination thereof The data rate may also be selected based on other factors. One or more rates may be selected for a MIMO transmission, depending on how data streams are processed and sent.

FIG. 9A shows a design of a process 900 for operating a station on two links. The station may communicate with a first station on a first link via an omni-directional antenna (block 912). The station may communicate with a second station on a second link via a directional antenna (block 914). The first link may be for a wireless medium shared by stations in a wireless network, e.g., an IEEE 802.11 WLAN or mesh network. The second link may be for a backhaul to a wired access point. The first and second links may be for the same or different frequency bands. The station may simultaneously communicate with the first station on a first frequency band and with the second station on a second frequency band. The first and second frequency bands may or may not overlap. If these frequency bands overlap, then they may overlap partially, or one frequency band may completely overlap the other frequency band.

The first and second links may be for the same wireless network, and the first and second stations may be the same station. In one design, control frames may be exchanged on the first link via the omni-directional antenna, and data frames may be exchanged on the second link via the directional antenna. The omni-directional may be used minimally, e.g., to capture a small amount of data so as to determine which directional antenna should be used.

FIG. 9B shows a design of an apparatus 950 for operating on two links. Apparatus 950 includes means for communicating with a first station on a first link via an omni-directional antenna (block 952) and means for communicating with a second station on a second link via a directional antenna (block 954). Modules 952 and 954 may comprise one or more ICs, processors, electronics devices, hardware devices, electronics components, logical circuits, memories, etc., or any combination thereof.

The omni-directional and directional antennas may be used for communication in various manners. One specific use of these antennas for communication is described below.

In IEEE 802.11, stations contend for the wireless medium through a Carrier Sense Multiple Access with Collision Avoidance (CSMA/CA) protocol, which prevents neighbor stations from transmitting simultaneously. In addition, a station may reserve a certain amount of time for transmission on the wireless medium by using an RTS/CTS exchange. For this exchange, a given station A may send an RTS frame containing a requested duration to another station B, which may be an access point for this exchange. The requested duration may cover the amount of time needed to transmit pending data and associated signaling. Station B may grant the request and send a CTS frame to station A. Station A may then transmit on the wireless medium for the granted duration.

The RTS/CTS exchange is intended to prevent interference from hidden nodes, which are stations that are out of communication range of one another but can still cause interference to each other. For example, two stations on opposite sides of an access point may be hidden from one another but their transmissions may interfere with each other at the access point. In order for the RTS/CTS exchange to be effective, all neighbor stations in the vicinity of stations A and B should be able decode the RTS and/or CTS frames and set their network allocation vector (NAV) timers according to the duration included in the RTS and CTS frames. Since the RTS and CTS frames can arrive from any arbitrary direction, each station may use omni-directional antenna to receive these frames. In may be desirable for a station to receive all control frames, such as RTS and CTS frames, via omni-directional antenna at all times in order to ensure that these control frames can be received. Nevertheless, there may be neighbor stations that cannot decode the RTS and/or CTS frames, e.g., due to their geographical locations and other factors. Consequently, these neighbor stations may not remain silent during the granted duration, and the transmissions from these neighbor stations may interfere with the transmission from station A or B and reduce the effective rate of the transmission.

Directional antennas may be used to reduce the adverse impact of interference by suppressing interference that arrives from directions that are away from the direction of the transmit and receive stations. This interference suppression may improve SNR and allow for use of higher data rate. Therefore, combining the use of RTS/CTS along with directional antennas may enhance throughput.

Figures 10A, 10B:
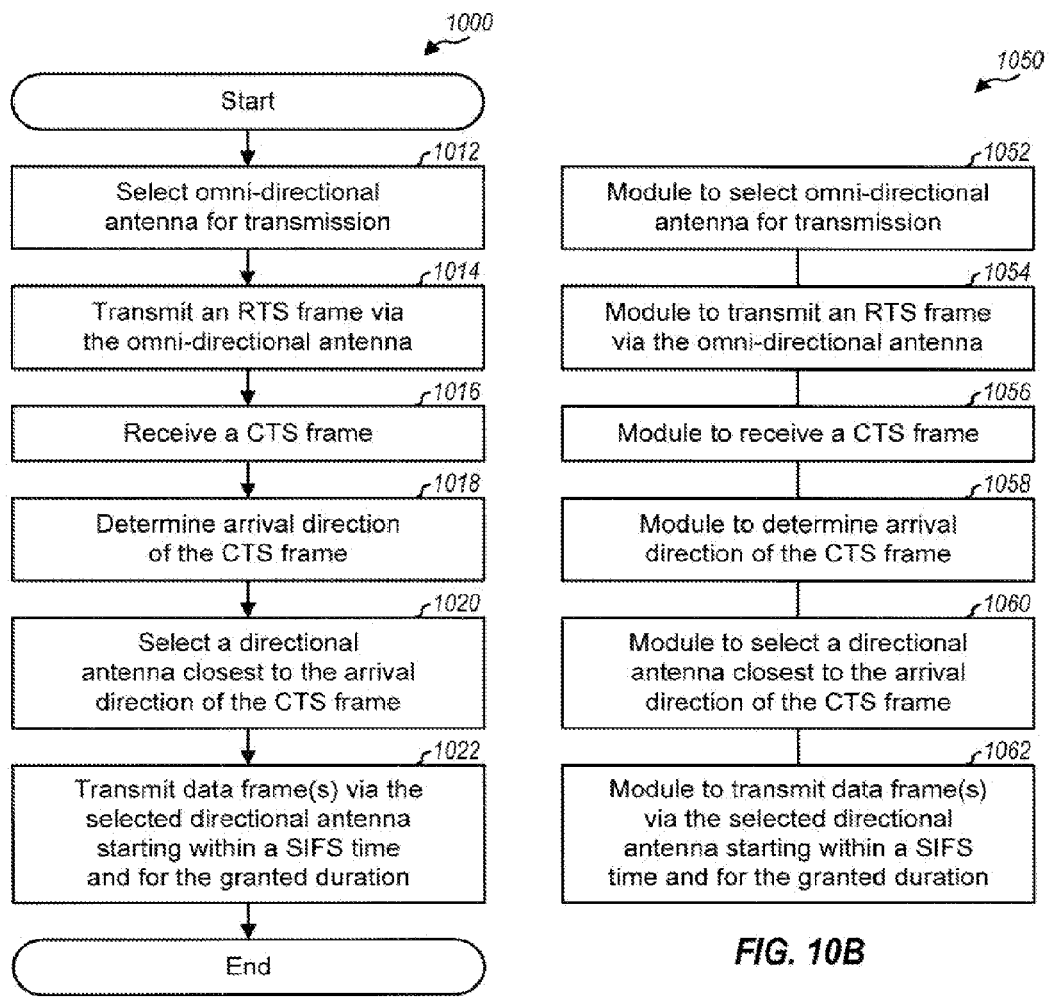
FIGS. 10A and 10B show a process and an apparatus, respectively, for transmitting data frames in an RTS/CTS exchange.

FIG. 10A shows a design of a process 1000 performed by transmit station A for an RTS/CTS exchange. Initially, station A selects the omni-directional antenna for transmission (block 1012). Station A transmits an RTS frame containing a requested duration to receive station B via the omni-directional antenna (block 1014). Thereafter, station A receives a CTS frame from station B (block 1016) and determines the arrival direction of the CTS frame, e.g., using any of the designs described above (block 1018). Station A selects a directional antenna that is closest to the arrival direction of the CTS frame, which is the direction of receive station B (block 1020). Station A then transmits one or more data frames to station B via the selected directional antenna starting within a short interframe space (SIFS) time and for the granted duration (block 1022). Station B may receive the data frames from station A using an omni-directional or a directional antenna. Transmit station A may switch back to the omni-directional antenna after the granted duration.

Transmit station A may cause less interference to other stations by transmitting data frames to receive station B using a directional antenna. Furthermore, the directional antenna may have higher gain than the omni-directional antenna, which may allow for use of higher data rate for the transmission from station A to station B. Station A may revert to omni-directional transmission once the data transmission to station B is over.

FIG. 10B shows a design of an apparatus 1050 for an RTS/CTS exchange. Apparatus 1050 includes means for selecting an omni-directional antenna for transmission (module 1052), means for transmitting an RTS frame containing a requested duration to receive station B via the omni-directional antenna (module 1054), means for receiving a CTS frame from station B (module 1056), means for determining the arrival direction of the CTS frame (module 1058), means for selecting a directional antenna that is closest to the arrival direction of the CTS frame (module 1060), and means for transmitting one or more data frames to receive station B via the selected directional antenna starting within a SIFS time and for the granted duration (module 1062). Modules 1052 through 1062 may comprise one or more ICs, processors, electronics devices, hardware devices, electronics components, logical circuits, memories, etc., or any combination thereof.

In the design shown in FIGS. 10A and 10B, transmit station A uses directional data transmission for the duration of the RTS/CTS exchange if the direction of receive station B is known. Station A uses omni-directional transmission at other times when the direction of the recipient stations may not be known. Station A thus uses directional transmission in a manner that is backward compatible with IEEE 802.11 and yet may enhance throughput.

FIG. 11A shows a design of a process 1100 performed by receive station B for an RTS/CTS exchange. Initially, station B selects the omni-directional antenna for data reception (block 1112). Station B receives an RTS frame from transmit station A and determines the intended destination/recipient of this RTS frame (block 1114). If station B is the destination of the RTS frame ('Yes' for block 1116), then station B transmits a CTS frame via the omni-directional antenna (block 1118). Station B determines the arrival direction of the RTS frame, e.g., using any of the designs described above (block 1120). Station B selects a directional antenna that is closest to the arrival direction of the RTS frame, which is the direction of transmit station A (block 1122).

Transmit station A receives the CTS frame and may begin transmitting data frames using an omni-directional antenna or a directional antenna. If receive station B detects data within SIFS time ('Yes' for block 1124), then station B receives one or more data frames from station A via the selected directional antenna for the granted duration (block 1126). Station B may switch back to the omni-directional antenna after the granted duration, or if data was not detected from station A within SIFS time ('No' for block 1124), or if station B is not the intended recipient of the RTS frame ('No' for block 1116).

Since station B receives data frames from station A using a directional antenna, interference from other stations may be suppressed. Hence, a higher data rate may be used for the transmission from station A to station B than what may be possible without directional reception. Station B may revert to omni-directional reception once the data transmission from station A is over.

FIG. 11B shows a design of an apparatus 1150 for an RTS/CTS exchange. Apparatus 1150 includes means for selecting an omni-directional antenna for data reception (block 1152), means for receiving an RTS frame from transmit station A and determining the intended destination/recipient of this RTS frame (block 1154), means for transmitting a CTS frame via the omni-directional antenna (block 1156), means for determining the arrival direction of the RTS frame (block 1158), means for selecting a directional antenna that is closest to the arrival direction of the RTS frame (block 1160), and means for receiving one or more data frames from station A via the selected directional antenna for the granted duration (block 1162). Modules 1152 through 1162 may comprise one or more ICs, processors, electronics devices, hardware devices, electronics components, logical circuits, memories, etc., or any combination thereof.

In the design shown in FIGS. 11A and 11B, receive station B uses directional reception for the duration of the RTS/CTS exchange if the direction of transmit station A is known. Station B uses omni-directional reception at other times when the direction of transmit stations may not be known. Station B thus uses directional reception in a manner that is backward compatible with IEEE 802.11 and yet may enhance throughput.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an integrated circuit (IC), a field programmable gate array (FPGA) or other programmable logic device, discrete gate or transistor logic, discrete hardware components, or any combination thereof designed to perform the functions described herein. An IC may be an application specific integrated circuit (ASIC) and may include one or more processors, memories, etc., or any combination thereof. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. An apparatus implementing the techniques described herein may be an IC, a device that includes an IC or a set of ICs, any one or combination of the hardware units described above, etc.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an IC. The IC may reside in a user terminal In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of operating a wireless communications apparatus, comprising:
   sending a Request to Send (RTS) frame to a station via an omni-directional antenna;
   receiving a Clear to Send (CTS) frame from the station via the omni-directional antenna, said omni-directional antenna being a separate antenna from a plurality of directional antennas which receive said CTS frame or a synthesized antenna which is formed from said plurality of directional antennas which receive said CTS frame;
   determining at least one of received signal strength or received signal quality of the received CTS frame for each of said plurality of directional antennas; and
   selecting a directional antenna from said plurality of directional antennas based on the received signal strength for each of the plurality of directional antennas or the determined received signal quality for each of the plurality of directional antennas, the selected directional antenna having at least one of a highest received signal strength of the received CTS frame when said selection is based on the determined received signal strength and having the highest received signal quality when said selection is based on the determined quality of the received CTS frame.

2. The method of claim 1, further comprising:
   sending at least one data frame to the station via the selected directional antenna.

3. The method of claim 2, further comprising:
   switching back to the omni-directional antenna after sending the at least one data frame to the station.

4. The method of claim 1,
   wherein determining received signal strength or received signal quality of the received CTS frame for each of a plurality of directional antennas includes determining received signal strength of the CTS frame for each of a plurality of directional antennas; and
   wherein said step of selecting a directional antenna includes selecting the directional antenna having the highest received signal strength of the CTS frame.

5. The method of claim 1,
   wherein determining received signal strength or received signal quality of the received CTS frame for each of a plurality of directional antennas includes determining received signal quality of the CTS frame for each of a plurality of directional antennas; and
   wherein said step of selecting a directional antenna includes selecting the directional antenna having the highest received signal quality of the CTS frame.

6. The method of claim 1, further comprising:
   receiving a data rate from said station, said data rate being a data rate that was selected based on a received signal quality of a signal transmitted from said omni-directional antenna; and
   making an adjustment to said received data rate, to determine a data rate for transmission, based on a difference in an antenna gain of said omni-directional antenna and a gain of at least the selected directional antenna.

7. The method of claim 1, wherein said omni-directional antenna is a separate antenna from the plurality of directional antennas.

8. The method of claim 1, wherein said omni-directional antenna is a synthesized antenna which is formed from said plurality of directional antennas which receive said CTS frame, said omni-directional antenna including antenna elements which are included in said plurality of directional antennas.

9. An apparatus for wireless communication, comprising:
   at least one integrated circuit configured to:
   send a Request to Send (RTS) frame to a station via an omni-directional antenna;
   receive a Clear to Send (CTS) frame from the station via the omni-directional antenna, said omni-directional antenna being a separate antenna from a plurality of directional antennas which receive said CTS frame or a synthesized antenna which is formed from said plurality of directional antennas which receive said CTS frame;
determine at least one of received signal strength or received signal quality of the received CTS frame for each of a plurality of directional antennas; and
select a directional antenna from said plurality of directional antennas based on the received signal strength for each of the plurality of directional antennas or the determined received signal quality for each of the plurality of directional antennas, the selected directional antenna having at least one of a highest received signal strength of the received CTS frame when said selection is based on the determined received signal strength and having the highest received signal quality when said selection is based on the determined quality of the received CTS frame.

10. The apparatus of claim 9, wherein said at least one integrated circuit is further configured to:
send at least one data frame to the station via the selected directional antenna.

11. The apparatus of claim 9, wherein the at least one integrated circuit is configured to determine received signal strength of the CTS frame for each of a plurality of directional antennas; and
wherein said at least one integrated circuit is configured to select the directional antenna having the highest received signal strength of the CTS frame.

12. An apparatus for wireless communication, comprising:
means for sending a Request to Send (RTS) frame to a station via an omni-directional antenna;
means for receiving a Clear to Send (CTS) frame from the station via the omni-directional antenna, said omni-directional antenna being a separate antenna from a plurality of directional antennas which receive said CTS frame or a synthesized antenna which is formed from said plurality of directional antennas which receive said CTS frame;
means for determining at least one of received signal strength or received signal quality of the received CTS frame for each of a plurality of directional antennas; and
means for selecting a directional antenna from said plurality of directional antennas based on the received signal strength for each of the plurality of directional antennas or the determined received signal quality for each of the plurality of directional antennas, the selected directional antenna having at least one of a highest received signal strength of the received CTS frame when said selection is based on the determined received signal strength and having the highest received signal quality when said selection is based on the determined quality of the received CTS frame.

13. The apparatus of claim 12, further comprising:
means for sending at least one data frame to the station via the selected directional antenna.

14. The apparatus of claim 13, further comprising:
means for switching back to the omni-directional antenna after sending the at least one data frame to the station.

15. The apparatus of claim 12,
wherein said means for determining at least one of received signal strength or received signal quality determine received signal strength of the CTS frame for each of a plurality of directional antennas; and
wherein said means for selecting a directional antenna select said directional antenna having the highest received signal strength of the CTS frame.

16. The apparatus of claim 12, wherein said means for determining at least one of received signal strength or received signal quality determine received signal quality of the CTS frame for each of a plurality of directional antennas; and
wherein said means for selecting a directional antenna select said directional antenna having the highest received signal quality of the CTS frame.

17. A non-transitory computer readable medium comprising computer readable instructions stored thereon, the computer readable instructions executable by at least one computer to:
send a Request to Send (RTS) frame to a station via an omni-directional antenna;
receive a Clear to Send (CTS) frame from the station via the omni-directional antenna, said omni-directional antenna being a separate antenna from a plurality of directional antennas which receive said CTS frame or a synthesized antenna which is formed from said plurality of directional antennas which receive said CTS frame;
determine at least one of received signal strength or received signal quality of the received CTS frame for each of a plurality of directional antennas; and
select a directional antenna from said plurality of directional antennas based on the received signal strength for each of the plurality of directional antennas or the determined received signal quality for each of the plurality of directional antennas, the selected directional antenna having at least one of a highest received signal strength of the received CTS frame when said selection is based on the determined received signal strength and having the highest received signal quality when said selection is based on the determined quality of the received CTS frame.

18. The non-transitory computer readable medium of claim 17, further comprising computer readable instructions executable by said at least one computer to:
send at least one data frame to the station via the selected directional antenna.

19. A station for wireless communication, comprising:
an omni-directional antenna;
a plurality of directional antennas; and
at least one integrated circuit configured to:
send a Request to Send (RTS) frame to another station via the omni-directional antenna;
receive a Clear to Send (CTS) frame from the other station via the omni-directional antenna, said omni-directional antenna being a separate antenna from a plurality of directional antennas which receive said CTS frame or a synthesized antenna which is formed from said plurality of directional antennas which receive said CTS frame;
determine at least one of received signal strength or received signal quality of the received CTS frame for each of a plurality of directional antennas;
select a directional antenna from among the plurality of directional antennas based on the received signal strength for each of the plurality of directional antennas or the determined received signal quality for each of the plurality of directional antennas, the selected directional antenna having at least one of a highest received signal strength of the received CTS frame when said selection is based on the determined received signal strength and having the highest received signal quality when said selection is based on the determined quality of the received CTS frame.

20. The station of claim 19, wherein said at least one integrated circuit is further configured to:
- send at least one data frame to the other station via the selected directional antenna.

21. The station of claim 20, wherein said at least one integrated circuit is further configured to:
- control said station to switch back to the omni-directional antenna after sending the at least one data frame to the station.

22. The station of claim 19, wherein said at least one integrated circuit is configured to:
- determine received signal strength of the CTS frame for each of a plurality of directional antennas; and
- select the directional antenna having the highest received signal strength of the CTS frame as part of being configured to select a directional antenna from among the plurality of directional antennas.

* * * * *